Dec. 28, 1937.                J. L. GETAZ                2,103,326
                GEAR SHIFT MECHANISM FOR AUTOMOBILE TRANSMISSIONS
                          Filed Sept. 16, 1935
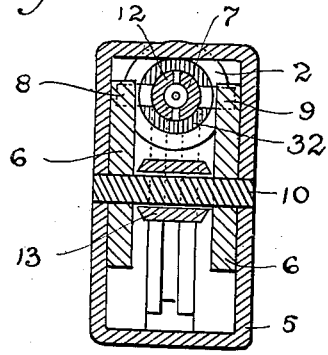
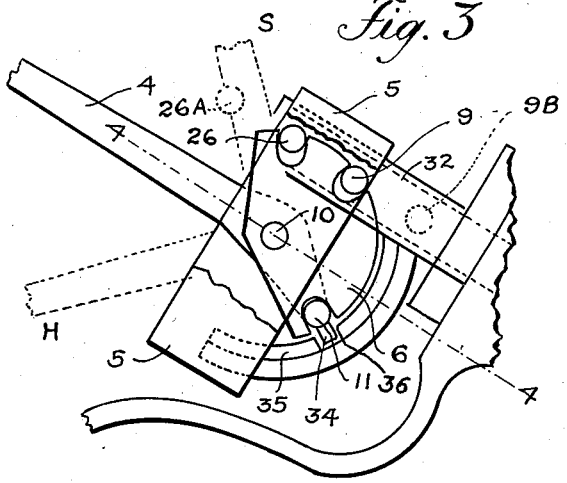
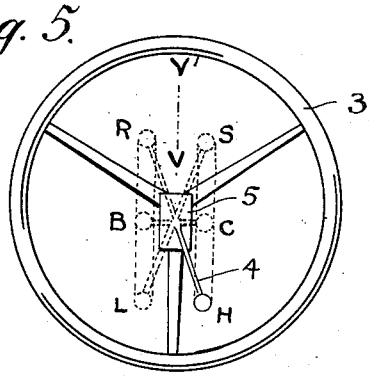
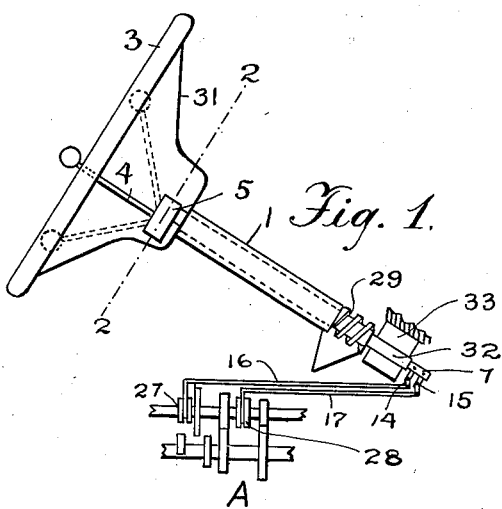
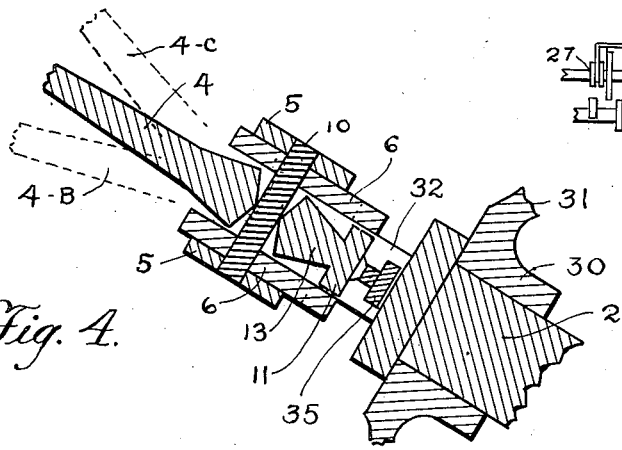

Patented Dec. 28, 1937

2,103,326

UNITED STATES PATENT OFFICE 2,103,326

GEAR SHIFT MECHANISM FOR AUTOMOBILE TRANSMISSIONS

James L. Getaz, Maryville, Tenn.

Application September 16, 1935, Serial No. 40,697

16 Claims. (Cl. 74—473)

This invention relates to automobile transmissions and more particularly to means for operating or shifting an automobile transmission in order to establish different gear ratios, and it is the object of this invention to provide an improved operating means for an automobile transmission of such construction that it can be operated with more convenience and safety than can be obtained with the methods of operation now in use. It is an object of this invention to place the lever for shifting of the gears in the line of vision of the operator, so that when the operator is behind the steering wheel and looking ahead of the automobile, the gear shift lever will be directly in front of the operator, and the position of this lever will be most easily observed by him. It is also an object of this invention to so provide for the movement of this gear shift lever that it may be moved from side to side in the direct line of vision of the operator for selective connection to the gears. It is also an object of this invention to provide for the movement of the gear shift lever backward and forward directly in front of the operator for shifting the gears, so that the attention of the operator need not be diverted to one side in gear shifting operations.

In the drawing which shows a preferred embodiment of this invention:

Fig. 1 is a diagrammatic view showing a side elevation of the gear shift lever and its connection to the gear set;

Fig. 2 is a full size section along the line 2—2 of Fig. 1;

Fig. 3 is a full size side elevation of the mechanism connected to the gear shift lever;

Fig. 4 is a full size section along the line 4—4 of Fig. 3;

Fig. 5 is a diagrammatic view showing the gear shift lever and steering wheel as seen by the operator when he is sitting in a driving position behind the steering wheel.

As shown in the drawing, an automobile transmission constructed in accordance with this invention comprises the usual change-speed gears or gear set, as shown at A in Fig. 1, the gears of which are operated by yokes 27 and 28 connected to rods 16 and 17 respectively. It also comprises the usual steering post 1, a steering wheel 3 and a hollow shaft 2 connected to the steering wheel, and turning within the post 1 and connected to the worm 29 for operating the steering mechanism. The rim of the steering wheel and the spokes 31 form an inverted cone with the hub 30 of the wheel at the apex of the cone. The gear shift lever 4 is mounted on an axis 10 near the hub of the steering wheel. The conical shape of the steering wheel and its spokes provides depth for location of the gear shift lever, so that in a driving position the lever does not project above the rim of the wheel, as shown in Fig. 1.

Within the hollow shaft 2 is a fixed tube 32 which is fastened below the worm of the steering mechanism at 33 to the frame of the car. To the upper end of this tube 32 just above the hub of the steering wheel is fastened the frame 5, which supports the horizontal shaft 10 on which the gear shift lever 4 turns in shifting the gears. The bearing 13 of the gear shift lever 4 is enlarged at each side as shown in Fig. 4 so that the lever may be rocked from side to side to the dotted positions 4B and 4C. At the lower end of gear shift lever 4 and on either side are pins 11 as shown in Figs. 3 and 4. These pins 11 engage slots in discs or pinions 6, which are mounted on shaft 10 on either side of lever 4. By rocking the lever 4 to one of its side positions 4B or 4C it will selectively engage one of the discs 6 and rotate same by the backward and forward rotation of the lever on shaft 10.

Within the fixed tube 32 are shown two reciprocating rods of segmental cross section, 7 and 12, which connect with discs 6 at their upper ends and are connected with rods 16 and 17 at their lower ends through the bell cranks 14 and 15.

As shown in Fig. 3, on one of these reciprocating rods 7 are two pins 9 and 26 which engage in slots in disc 6. When this disc is rotated by lever 4, rod 7 is moved in longitudinal direction. When lever 4 is rotated to the dotted position S as shown in Fig. 3, rod 7 is moved down until the pin 9 is moved to the dotted position 9B, and when the lever 4 is rotated to the dotted position H, the rod 7 is raised until the pin 26 is moved to the position 26A. Rod 12 is moved in a similar manner when lever 4 is rocked from 4B to 4C and engages the other disc 6.

The longitudinal movement of rods 7 and 12 turns the bell cranks 14 and 15 and imparts a longitudinal movement to rods 16 and 17, to which they are connected, and by this means the gears are shifted.

The different positions of lever 4 for different gear engagements are shown diagrammatically in Fig. 5, and are similar to the positions of levers now in use.

The line of vision of the operator is along the line V—V¹. If the lever 4 is rocked to the right of V—V¹ it will engage connection to one of the gear shift rods and by being rotated on the shaft 10 to positions H and S, the gears will be shifted into corresponding gear ratios. If the lever 4 is rocked to the left of V—V¹ it will engage the other gear shift rod and by being rotated on the shaft 10 to positions R and L, the gears will be shifted into corresponding gear ratios.

To keep the lever 4 on the proper side of the line of vision V—V¹, there is provided on the lower end of lever 4 a projection 34 which is guided by a circular ridge 35 fastened to the frame 5 and the tube 32, as shown in Figs. 3 and 4. A notch 36 is provided in ridge 35 so that when lever 4 is in neutral position the projection 34 may pass through from one side of ridge 35 to the other side.

The positions of the gear shift lever 4 as shown in Fig. 5 are as follows: When it is neutral it is approximately parallel to the steering post 1 as shown in the full line positions in Figs. 1, 3 and 4. To shift into low or reverse gears the lever is rocked to the left to position B to the left of the line of vision V—V¹. This line of vision of the operator is in a vertical plane passing through the steering post 1 and parallel to the direction of the car. By rotating the lever about the axis 10 in a circular path parallel to a vertical plane through V—V¹, the lever is moved to the position R for reverse gear and L for low gear.

In a similar manner the lever is brought to neutral and moved to the position C to the right of the line V—V¹ and rotated to the position S for second gear and to the full line position H for high gear. By this means all positions and motions of the lever are directly in front of the operator.

I claim:

1. In an automobile, a set of gears, a lever for shifting said gears, a steering wheel, a hollow shaft operated by said steering wheel, a support through said hollow shaft for said lever, a plurality of means connected to the gears, and adapted to be engaged by said lever to actuate the gears, said means extending through said hollow shaft, said lever being rotatable to either side of a vertical plane parallel to said hollow shaft for selective engagement of said lever with one of said means for shifting of said gears.

2. In an automobile, a set of gears, a lever for shifting said gears, a steering wheel, a hollow shaft operated by said steering wheel, a support through said hollow shaft for said lever, a plurality of means connected to the gears and adapted to be engaged by said lever to actuate the gears, said means extending through said hollow shaft, said lever being oscillatable with a mean position of said lever in a vertical plane, in which position said lever is disengaged from said connecting means.

3. In an automobile, a set of gears, a lever for shifting said gears, a steering wheel, a hollow shaft operated by said steering wheel, a support through said hollow shaft for said lever, a plurality of means connected to the gears, and adapted to be engaged by said lever to actuate the gears, said means extending through said hollow shaft, said lever being oscillatable in a path perpendicular to a vertical plane for selective engagement of said lever with one of said means for shifting of said gears.

4. In an automobile, a set of gears, a lever for shifting said gears, a steering wheel, a hollow shaft operated by said steering wheel, a support through said hollow shaft for said lever, a plurality of means connected to the gears, and adapted to be engaged by said lever to actuate the gears, said means extending through said hollow shaft, said lever being oscillatable reciprocally about an axis perpendicular to said hollow shaft for selective engagement of said lever with one of said connecting means, and said lever being oscillatable reciprocally about another axis perpendicular to said hollow shaft for selective movement of said means to which said lever is connected for shifting of said gears.

5. In an automobile, a set of gears, a lever for shifting said gears, a steering wheel, a hollow shaft operated by said steering wheel, a support through said hollow shaft supporting said lever above the hub of said steering wheel, a plurality of means connected to the gears, and adapted to be engaged by said lever to actuate the gears, said means extending through said hollow shaft, said lever being movable from a position parallel to said hollow shaft when said lever is disengaged from said connecting means to a position parallel with the spokes of said steering wheel when said gears are shifted by said lever to a gear ratio.

6. In an automobile, a set of gears, a lever for shifting said gears, a steering wheel, a hollow shaft operated by said steering wheel, a support through said hollow shaft supporting said lever above the hub of said steering wheel, two means connected to the gears and adapted to be engaged by said lever to actuate the gears, said means extending through said hollow shaft and terminating above the hub of said steering wheel, said lever being movable from a position in a vertical plane when said lever is disengaged from said connecting means, to a position to the right of said vertical plane when said lever is engaged with one of said connecting means for shifting into second and third gear ratios, and to a position to the left of said vertical plane when said lever is engaged with the other connecting means for shifting into first and reverse gear ratios.

7. In an automobile, a set of gears, a lever for shifting said gears, a steering wheel, a hollow shaft connected to said wheel, a support through said hollow shaft supporting said lever above the hub of said steering wheel, two means connected to the gears, and adapted to be engaged by said lever to actuate the gears, said means extending through said hollow shaft, said lever being movable from a position in a vertical plane when said lever is disengaged from said connecting means, to a position to the right of said vertical plane when said lever is connected to means for shifting said gears to second and third gear ratios, and to a forward position below the rim of the steering wheel when said lever has shifted said gears into second gear ratio, and to a rearward position below the rim of said steering wheel when said lever has shifted said gears into third gear ratio.

8. In an automobile, a set of gears, a lever for shifting said gears, a steering wheel, a hollow shaft connected to said wheel, a support through said hollow shaft supporting said lever above the hub of said steering wheel, two means connected to the gears, and adapted to be engaged by said lever to actuate the gears, said means extending through said hollow shaft, said lever being movable from a position in a vertical plane when said lever is disengaged from said connecting means, to a position to the left of said vertical plane when said lever is connected to means for shifting said gears to reverse and first gear ratios, and to a forward position below the rim of the steering wheel when said lever has shifted said gears into reverse gear ratio, and to a rearward position below the rim of said steering wheel when said lever has shifted said gears into first gear ratio.

9. In an automobile, a set of gears, a steering wheel, a hollow shaft operated by said steering wheel, a support extending through said hollow shaft terminating above the hub of said steering wheel and supporting a horizontal shaft, means connected to said gears consisting of two reciprocating rods terminating on either side of said hollow shaft above the hub of said steering wheel, a lever for shifting said gears movable on said horizontal shaft, said lever being oscillatable in a plane including the axis of said horizontal shaft for selective engagement with one of said connecting means, said lever being rotatable on said horizontal shaft for selective movement of said connecting means.

10. In an automobile, a set of gears, a steering wheel, a hollow shaft operated by said steering wheel, a lever for shifting said gears, a support for said lever extending through said hollow shaft, two connecting means between said lever and said gears extending through said hollow shaft, said lever being movable to selectively engage one of said connecting means and said lever being movable, in two circular paths, one path of motion of said lever for operation of one of said connecting means being to the right of a vertical plane through said hollow shaft, and the other path of said lever for operation of the other connecting means being to the left of said plane.

11. In an automobile, a set of gears, a lever for shifting said gears, a steering wheel, a hollow shaft operated by said steering wheel, means connected to the gears and adapted to be engaged by said lever to actuate the gears, said means extending through said hollow shaft, said lever being movable reciprocally about an axis perpendicular to said hollow shaft for selective engagement to said means, and said lever being oscillatable about another axis perpendicular to said hollow shaft for movement of said means in actuating said gears.

12. A transmission control mechanism for use in an automotive vehicle, provided with a transmission and a steering column, the said mechanism comprising reciprocable rods extending through said column, a lever-linkage system connecting the lower ends of said rods with said transmission, a wobble-lever mounted at the upper end of said column, and selective means in said column connecting the lowermost end of said wobble-lever with the upper ends of said rods to reciprocate the same alternatively and at will to effect a desired change in gear ratio.

13. A transmission control mechanism for use in an automotive vehicle, provided with a transmission and a steering column, the said mechanism comprising a lever mounted on the upper end of said column, connecting means extending through said column and connected at the lower end of said column in said transmission, and selective means in said column connecting the lowermost end of said lever with said connecting means, to operate said connecting means and at will to effect a desired change in gear ratio.

14. A transmission control mechanism for use in an automotive vehicle, provided with a transmission and a steering column, the said mechanism comprising a lever mounted on the upper end of said column, a plurality of connecting means extending through said column and connected at the lower end of said column to said transmission, said lever being movable to either side of a vertical plane parallel to said column for selective engagement of said lever with one of said connecting means, and selective means in said column connecting the lowermost end of said lever with said connecting means to operate said connecting means and at will to effect a desired change in gear ratio.

15. A transmission control mechanism for use in an automotive vehicle, provided with a transmission and a steering column, the said mechanism comprising a lever mounted on the upper end of said column, a plurality of connecting means extending through said column and connected at the lower end of said column to said transmission, said lever being movable about a mean position in a vertical plane parallel to said column to either side of said vertical plane for selective engagement of said lever with one of said connecting means, said lever in said mean position being disconnected from said connecting means.

16. A transmission control mechanism for use in an automotive vehicle, provided with a transmission and a steering column, the said mechanism comprising a lever mounted on said column, a plurality of connecting means extending through said column, and connected at the lower end of said column to said transmission, selective means in said column connecting the lowermost end of said lever with said connecting means, said lever being oscillatable about an axis perpendicular to said hollow shaft for selective engagement of said lever with one of said connecting means, and said lever being oscillatable about another axis perpendicular to said hollow shaft for selective movement of said connecting means to operate the shifting of said gear set.

JAMES L. GETAZ.